United States Patent
Pettigrew et al.

[11] Patent Number: 5,170,192
[45] Date of Patent: Dec. 8, 1992

[54] OXYGEN PERMEABLE BIFOCAL CONTACT LENSES AND THEIR MANUFACTURE

[75] Inventors: Lisa A. Pettigrew, Tempe; Donald J. Ratkowski, Chandler; William J. Burke, Tempe, all of Ariz.; Joseph I. Weinschenk, III, Irvine, Calif.

[73] Assignee: Pilkington Visioncare, Inc., Menlo Park, Calif.

[21] Appl. No.: 619,735

[22] Filed: Nov. 29, 1990

[51] Int. Cl.$^5$ .................................................. G02C 7/04
[52] U.S. Cl. .............................. 351/161; 351/160 R; 351/177
[58] Field of Search ............... 351/160 H, 160 R, 161, 351/162, 177

[56] References Cited

U.S. PATENT DOCUMENTS

| | | | |
|---|---|---|---|
| 3,560,598 | 2/1971 | Neefe | 264/1 |
| 3,597,055 | 8/1971 | Neefe | 351/161 |
| 3,684,357 | 8/1972 | Tsuetaki | 351/161 |
| 3,726,587 | 4/1973 | Kendall | 351/161 |
| 3,984,506 | 10/1976 | Tsuetaki | 264/1 |
| 4,302,081 | 11/1981 | Tsuetski | 351/161 |
| 4,614,624 | 9/1986 | Neefe | 264/2.5 |
| 4,921,205 | 5/1990 | Drew, Jr. et al. | 249/61 |

FOREIGN PATENT DOCUMENTS 0345994  5/1988  European Pat. Off. .

Primary Examiner—Scott J. Sugarman
Attorney, Agent, or Firm—Charles E. Cates

[57] ABSTRACT

An oxygen permeable bifocal contact lens with a Dk of at least $10 \times 10^{-11}$ in which a distance vision portion having a refractive index of not more than 1.49 is formed as a preform in which there is provided a recess, and a near distance vision portion having a refractive index of at least 1.540 is formed by filling the recess with a monomer mixture and polymerizing. It is preferred that the distance vision portion be formed as an interpenetrating network copolymer by partially polymerizing one monomer mixture to a predetermined relative viscosity and then adding a second monomer mixture and copolymerizing the resulting mixture. The near distance vision portion may also be formed as an interpenetrating network in the same manner.

30 Claims, 1 Drawing Sheet

OXYGEN PERMEABLE BIFOCAL CONTACT LENSES AND THEIR MANUFACTURE

The present invention relates to oxygen permeable bifocal contact lens made therefrom.

The manufacture of bifocal contact lenses utilizing a single type of polymer or copolymer for the lens means that the near vision portion must be relatively thick. This results in discomfort due to the increased pressure on the eye and the lack of oxygen permeability. The use of two different materials for each portion of the lens enables the weight of the lens to be reduced, thus increasing wearer comfort. The use of polymethyl methacrylate (refractive index 1.49) for the distance portion and polystyrene (refractive index 1.59) for the near portion has been proposed, but such a combination while lighter still has an oxygen permeability which is too low and can result in the wearer suffering discomfort and edema. This less than desireable oxygen permeability has resulted in limited acceptance of such lenses in the marketplace. A user satisfying contact lens must not only have an acceptable level of oxygen permeability but, in addition, good visual acuity at both near and far distances, adequate surface wettability, good dimensional stability, resistance to surface deposits, and durability which is good enough to withstand handling in use.

There is a need for an effective and user satisfying oxygen permeable bifocal contact lens. A bifocal contact lens which takes the form of a lens made of a bulk material of one refractive index for observing distant images and a segment of a material of a higher refractive index for observing near images is known as a two-piece lens. Various ways have been suggested for making such two-piece lenses and are disclosed in the following U.S. Pat. specifications:

| | |
|---|---|
| 3,560,598 | 3,726,587 |
| 3,597,055 | 4,302,081 |
| 3,684,357 | 4,921,205 |
| 3,984,506 | |

The use of a polymerized block of a monomeric material in which a recess has been filled with a high refractive index monomer and then polymerized to form a lens blank with a high index portion for near vision and a lower refractive index portion for distance vision has been described in U.S. Pat. No. 3,560,598. There is no suggestion in this disclosure to use materials which are oxygen permeable. U.S. Pat. No. 4,614,624 which was published in 1986 discloses a one-piece bifocal lens and suggests the use of silicone acrylates, but does not suggest how these materials might be used in forming a two-piece lens. U.S. Pat. No. 3,984,506 and 4,302,081 described the manufacture of what are described as fused bifocal contact lenses. The method of making these lenses described in the specification involves the use of a solid preform made of high index material against which is cast a low index material to form the bifocal blank. There is no suggestion that this process can be used to form an oxygen permeable bifocal contact lens blank, and it appears that the choice of the method used has been dictated by the need to avoid dimensional stability problems that arose with the type of high index materials available to the patentee.

We have now found that it is possible to produce a two-piece oxygen permeable bifocal contact lens by first forming a low index crosslinked oxygen permeable copolymer preform with a recess therein, into which there is cast a high index material. This process differs from the prior art in that we have found that warping of the lens can be avoided, and a good bond formed between the two materials by avoiding shrinkage though selection of an appropriate high index material. Suitable high index materials are those with a chemical structure which includes a substituted aromatic ring structure; these confer bulkiness on the monomer. Copolymers formed therefrom eliminate the dimensional stability problems referred to in the prior art.

The present invention differs from those described in the prior art in that the use of the copolymer systems of the present invention results in not only in the formation of a highly stable bond while still maintaining the required optical properties at the interface between any two of the different materials used, but also adequate oxygen permeability for user comfort is also achieved. The copolymer system used for both the distance and near vision portions is preferably an interpenetrating polymer network. A comprehensive review of interpenetrating polymer networks and their applications is provided in "Interpenetrating polymer networks and related materials." L. H. Sperling, Plenum Press, New York and London, 1981.

The use of an interpenetrating network mixture for at least one of the materials to be bonded together means that we have a material which undergoes little change in dimensions on polymerization and this helps to avoid rupture of and bond formed as polymerization proceeds.

We have described in European Specification 345,994 the formation of interpenetrating networks by adding one monomer mixture to another and how to use relative viscosity as a means of determining the optimum degree of polymerization of the one mixture which is to be added to the other unpolymerized mixture. We have now found that the extent of polymerization as indicated by the relative viscosity of the mixture is also important in determining not only the optimum point at which to mix two mixtures which form an interpenetrating network, but also when forming one interpenetrating network at an interface with another material which has been polymerized to a solid state (which material may itself be an interpenetrating network). The viscosity of the partially polymerized mixture is not only important as an indicator of when a satisfactory interpenetrating network can be formed, but also in determining when a satisfactory bond will result at the interface.

SUMMARY OF THE INVENTION

As noted above, it is apparent there is a definite need for a an oxygen permeable bifocal lens which will provide outstanding visual acuity at near and far distances and be safe, comfortable, durable, wettable, and resistant to protein deposits and can also be readily fabricated in an economical manner.

The present invention is based on the discovery of a combination of high and low refractive index copolymer compositions which are formulated to have good oxygen permeability and can be bonded together in a cast molding process to form a button from which high quality bifocal contact lenses can be readily manufactured.

Accordingly, an object of the present invention is to provide an oxygen permeable bifocal contact lens blank composed of selected high and low refractive index component compositions of such a nature that they bond tightly at the interface in such a manner as to provide a smooth transition between the high and low refractive index segments.

Another object of the present invention is to provide oxygen permeable bifocal contact lens blanks having near and far vision segments of such a nature that bifocal lenses cut from such blanks have, in addition to excellent vision over a range of distances without visual aberrations, and adequate oxygen permeability to ensure comfort and safety to the eye. By adequate oxygen permeability, we mean a permeability which when measured as Dk is at least $10 \times 10^{-11}$.

A further object of this invention is to provide high quality bifocal contact lenses, which have in addition to excellent visual properties and adequate oxygen permeability, outstanding durability, good wettability and superior dimensional stability and are resistant to staining and crazing.

An additional object of the present invention is to provide a cast molded bifocal lens blank consisting of a relatively low refractive index copolymer lens blank with a recess formed therein which has excellent adhesion for the higher refractive index copolymer resulting from the polymerization of the require comonomer compositions within the recess.

Another object of the present invention is to provide a high index of refraction comonomer composition which undergoes a minimum of shrinkage when the polymerization is completed within the recess of the lens blank with a substantially lower refractive index.

According to the invention, there is provided an oxygen permeable bifocal contact lens having a distance vision portion with one refractive index and a near vision portion with another higher refractive index and a Dk of at least $10 \times 10^{-11}$, the distance portion forming the major portion of the lens and being formed as a crosslinked copolymer with a refractive index of not more than 1.49 from monomeric materials which include one or more monomers capable of imparting oxygen permeability to the finished lens, and the near vision portion similarly being formed as a crosslinked copolymer from a monomer mixture which include one or more monomers at a concentration and with a refractive index such that the near vision portion has a refractive index of at least 1.540 including at least one vinyl monomer having a substituted aromatic ring structure which makes such monomers bulky and ensures there is only limited shrinkage on polymerization of such monomers and mixtures containing them.

A further objective is to provide new and improved copolymer composite materials of adequate oxygen permeability which are especially useful in the preparation of bifocal contact lenses having an outstanding combination of properties not previously achieved.

Another object is to provide a novel relatively simple process for directly converting a combination of vinyl polymerization systems into a contact lens blank from which high quality bifocal lenses can be readily obtained by conventional lathing procedures.

The means for achievement of these and other objectives in a novel and unexpected manner can be readily discerned from the following detailed description of the invention.

We prefer to form both near vision and distance vision portion as an interpenetrating network copolymer. The near vision portion, however, while it is preferably formed from an interpenetrating network can be a simple crosslinked copolymer, but in such a case the distance vision portion is preferably formed as an interpenetrating network.

The interpenetrating networks are formed by polymerizing monomer mixtures which are formed by mixing two monomer mixtures, one of which is partially polymerized to a selected viscosity relative to the other monomer mixture which is in an unpolymerized state.

In forming the distance vision portion of oxygen permeable bifocal contact lens according to the invention, an interpenetrating network can be chosen with a refractive index of not more 1.49 to form the distance portion and formed into a lens with a material with a refractive index of at least 1.540 forming the near portion. The interpenetrating network with a refractive index of not more than 1.49 is formed from two monomer mixtures A and B. The interpenetrating network composition is selected so that Mixture A contains 10 to 90% of total monomer formula weight. (By total monomer formula weight, we mean the total weight of monomers, including cross linking agents, but not initiator making up the total mixture of A and B). B provides the balance of the mixture of A and B.

We prefer to use a mixture of A and B, where A contains 50 to 90% of the total monomer formula weight, and B contains 10 to 50% of the total monomer formula weight.

An interpenetrating network polymer with a refractive index of at least 1.540 can be formed from two monomer mixtures C and D, and the resultant composition is selected so that mixture C contains 10 to 90% of the total monomer formula weight and the balance of the total is mixture D.

Our invention is particularly directed to an oxygen permeable bifocal contact lens with a Dk of at least $10 \times 10^{-11}$ in which the higher index segment is surrounded by an oxygen permeable low index material by forming the lens in a series of steps comprising first forming a preform from low index material in which there is provided a recess, filling the recess with a partially polymerized high index material formed from a monomer mixture which includes at least one vinyl monomer with a refractive index of at least 1.540 and having a substituted aromatic ring structure completing the polymerization of the high index material, and thereafter covering both the low index material and the high index material with further low index material in a partially polymerized form, and finally completing polymerization of the low index material to form a lens blank which is then machined into a bifocal contact lens.

Our invention also includes an oxygen permeable bifocal contact lens with a Dk of at least $10 \times 10^{-11}$ in which a base curve is cut in the polymerized high index material before the step of covering the high index material with low index material is carried out.

Our invention also includes a method of producing an oxygen permeable bifocal contact lens having a near vision portion and a distance vision portion, in which the near vision portion is formed in the body of the lens by polymerizing a partially polymerized mixture of interpenetrating network forming comonomers in contact with a surface shaped to leave a recess in the material both after polymerization and after removal from contact with the shaped surface, the recess being of the same shape as the desired shape of the near vision portion of the finished lens and a partially polymerized mixture of interpenetrating network comonomers including at least one vinyl monomer with refractive index of at least 1.540 and a substituted aromatic ring structure is placed in the recess and polymerized.

If desired, as described below, the near vision portion is covered with the material used to form the distance vision portion of the lens by polymerizing a further quantity of that material in contact with the already formed near and distance vision portions. Also, a base curve can be cut in the near vision portion before it is covered.

As will appear from the detailed description below, one method of making a bifocal contact lens according to the invention includes a method in which a quantity of material used to form the distance vision portion is placed in an open topped mold and a recess formed by providing the mold with a cover whose surface contacting the material is the recess forming surface. Using an open topped mold means that, if desired, a lens blank can be formed within the open topped mold and the mold used as a carrier during machining the lens blank to a final lens form.

The use of an open topped mold and a cover to form a lens casting cavity means that one or both optical surfaces can be formed during the lens casting operation making it possible to produce both finished and semi-finished lenses by simply shaping one or both major casting surfaces to the shape necessary to produce the desired optical surface.

Our invention further includes a method for producing an oxygen permeable bifocal contact lens with a Dk of at least $10 \times 10^{-11}$ by embedding a high refractive index polymer segment within a lens blank which has a substantially lower refractive index than that of the internal segment, the lens blank having been prepared by casting a partially polymerized mixture of low refractive index interpenetrating network forming comonomers including a silicone acrylate monomer against a mold with a protrusion so as to form a recess in the blank and polymerizing to a solid state, the recess being then filled with a relatively high refractive index monomer mixture, which includes at least one vinyl monomer with a refractive index of at least 1.540 and a substituted aromatic ring structure, the polymerization of which is then completed in the recess, a sufficient quantity of partially polymerized low refractive index monomer mixture being next added to completely cover the high refractive index segment, and the resulting composition is cured to form the final bifocal contact lens blank, which is in turn machined to form a bifocal contact lens. If desired before covering the high refractive index segment with low index material, the base curve of the add segment maybe lathe cut to a desired configuration.

Our invention is particularly of value in producing a gas permeable bifocal contact lens with a Dk of at least 10, formed from at least two materials joined by a stable optically clear bond. Dk is defined as $(y)10^{-11}(cm^2/sec)(mlO_2 \times mm\ Hg)$ at $35°-37°$.

In forming the components of the and contact lens blanks of the present invention, the composition of low and high refractive index comonomer mixtures is selected in each case so that the resulting low and high refractive index copolymers form a strong uniform bond at the interface of the two types of copolymers. This is necessary in order to eliminate warpage and separation of the two components in order to obtain the desired optical parameters required for high quality oxygen permeable bifocal contact lenses.

In forming the low refractive index portion, suitable copolymers include those prepared from a comonomer mixture containing: a low molecular weight alkyl acrylate such as, methyl methacrylate or methyl acrylate; a silicone acrylate such as, an acryloxypropyltris (trimethylsiloxy) silane, crosslinking agents such as, ethylene dimethacrylate and 1,3-bis (methacryloxypropyl) 1,1,3,3-tetrakis (trimethylsiloxy) disiloxane, wetting agents such as, methacrylic acid and N-vinylpyrrolidone. In this disclosure, it is understood that the term acrylic includes methacrylic.

The substantial shrinkage which vinyl monomers undergo can cause serious problems in a cast molding process. This is particularly true when the objective is the development of a strong distortionfree interfacial bond between two vinyl copolymer compositions with substantially different refractive indices such as is required in the manufacture of the bifocal contact lens and lens blank of the present invention.

We prefer to reduce undesirable shrinkage during polymerization by employing for both near and distance vision portions of the lens separate comonomer mixtures capable of forming copolymers which are interpenetrating networks. They are designated as state above Mixture A and Mixture B for the distance vision portion and Mixture C and Mixture D for the near vision portion. In the first step of the preparation of the distance vision copolymer, Mixture A is partially polymerized to a predetermined relative viscosity and then added to Mixture B and the resulting composition is then copolymerized. In a similar manner in the preparation of the distance segment, Mixture C is partially polymerized to the desired relative viscosity and then added to Mixture D. The polymerization of the resulting composition is then effected. The relative viscosity referred to in the present instance is defined as the viscosity of the partially polymerized comonomer mixture divided by the viscosity of the corresponding unpolymerized comonomer mixture at a given temperature.

The viscosity is measured during the polymerization, and techniques are readily available for doing this. The reaction mixture may be polymerized under a blanket of nitrogen so that when it is exposed to obtain a sample, polymerization ceases or is substantially slowed down due to the inhibiting effect of oxygen in the air. A sample is removed and the viscosity measured to determine the relative viscosity.

In addition to reducing undesirable shrinkage of the comonomer mixtures during polymerization as indicated above, the formation of an interpenetrating polymer network system makes it possible to control the penetratability of the high refractive index comonomer composition into the low refractive index solid portion during final polymerization of the high index portion. Further, the partial polymerization of the comonomers during the first step of the polymerization of the comonomers for the high refractive index segment reduces the time required for polymerization of the mixture of C and D in contact with the low index solid portion. This further reduces the possibility of warpage or separation of the two components and determines the extent of penetration into the solid portion, though this may also be related to the nature of the polymerized state of the solid portion which may contain minor amounts of extractable unpolymerized material.

In another form of our invention, the Mixture C is not partially polymerized and then added to Mixture D. Instead, all of the components which make-up the combination of C and D are simply mixed and cast into the recess without any deliberate partial polymerization.

Monomers useful in the preparation of the low refractive index copolymers A/B used for the distance vision portion of the invention include hydrophobic low molecular weight acrylates of the general formula:

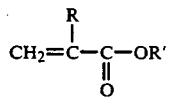

where R is H or a monovalent organic radical having no more than seven carbon atoms and R' is a monovalent organic radical having fewer than 20 carbon atoms. Such acrylates include, methyl methacrylate, isobornyl acrylate, methyl alpha carboxymethyl acrylate, and cyclohexyl acrylate. Use of such acrylates in the comonomer mixture results in improved surface hardness and increased scratch resistance. In general, up to 25% of the total monomer formula weight of such acrylates are present in the comonomer mixture and from 3 to 8% is a preferred range since this amount results in improved physical properties of the copolymer without any great reduction in the Dk of the copolymer.

It is also desirable to include in the low refractive index comonomer composition at least one hydrophylic monomer such as Nvinylpyrrolidone, 2-hydroxyethyl methacrylate or methacrylic acid in a concentration of about 1 to about 15%, and preferably from about 3 to about 12% of the total comonomer mixture.

The use of acryloxyalkylpolysiloxane monomers in the low refractive index comonomer mixture is necessary to provide a copolymer with an oxygen permeability Dk of at least $10 \times 10^{-11}$, the silicone acrylates suitable for use in this invention have the general formula:

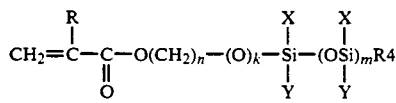

where R=H or monovalent organic radical having from one to seven carbon atoms; X is a monovalent organic radical having from one to seven carbon atoms; Y is a monovalent organic radical having one to seven carbon atoms or Z where

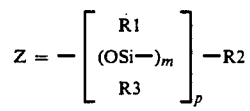

where R1, R2, and R3 are the same or different monovalent organic radicals having from one to seven carbon atoms and R4 is OH or a monovalent organic radical having from one to seven carbon atoms; where k=0-1; m=1-3; n=1-5; and p=1-3.

Examples of representative suitable acryloxyalkylpolysiloxanes include: 3-methacryloxypropyl-tris-(trimethylsiloxy)silane; bis(trimethylsiloxy)-3-methacryloxypropylsilanol, 3-acryloxypropoxytris-(tri methylsiloxy)silane and 3-acryloxypropyl-1,1,1-trimethyl-3,3,5,5-tetrakis (trimethylsiloxy)trisiloxane. In general from 10 to 65% of the acryloxyalkylpolysiloxanes are used in the low refractive index comonomer mixture when forming an oxygen permeable material. Best overall properties are obtained when the acryloxyalkyl polysiloxanes make up about 35 to 55% (w/w) of the total of the comonomer mixture and where k=0.

Addition of fluoro substituted acrylic monomers to the low refractive index comonomer polymerization mixture increase the resistance of the final bifocal contact lenses to protein and other surface deposits and contributes to lowering the refractive index of the resulting copolymer. Such fluoro containing acrylic monomers have the general formula:

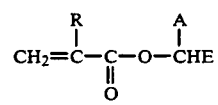

where R=H or a monovalent organic radical having up to eight carbon atoms; A=H or E; and E is a fluorinated monovalent organic group having up to 20 carbon atoms. Suitable specific fluoroacrylates include: 2,2,2-trifluoroethyl acrylate; nonafluoro cyclohexyl methacrylate; 2-(N-ethylperfluorooctanesulfamido)ethyl acrylate; alpha-fluoroacrylonitrile; and 1,1-dihydroperfluorononyl methacrylate. When present, up to about 35% (w/w) of the fluoroacrylate of the total comonomer concentration is used of the low refractive index polymerization mixture and a concentration of about 2 to 25% is preferred. Examples of suitable formulations of both Mixture A and Mixture B may be found in European Specification 345,994, as well as in the examples appended hereto.

The comonomer mixture used in the preparation of the high refractive index portion C/D contains at least one polymerizable vinyl monomer having a substituted aromatic ring structure so as to form a copolymer with a refractive index of at least 1.540. Suitable monomers include: carbazoles such as, N-vinylcarbazole, N-ethyl-3-vinylanisole, 3-(N-carbazoyl)propyl acrylate, 2-(N-carbozyl)-1-methylethyl acrylate, and 6-(N-carbazoyl) hexyl methacrylate; 2-(N-phenothiazinyl) ethyl acrylate; styrene derivatives such as, vinyl anisole; and p-t-butylstyrene; vinyl naphthalene; and aromatic acrylates such as, phenyl and benzyl methacrylates. The use of carbazoles having a polymerizable vinyl or acrylate group is preferred.

The comonomer mixture for the preparation of the high refractive index copolymer contains other monomers in addition to monomers conferring high refractive index on the copolymer of the type listed above. It is desirable, for example, to include a monomer such as, N-vinylpyrrolidone or methacrylic acid as a wetting agent and monomers such as, methyl methacrylate which can contribute strength and durability to the final copolymer, and crosslinking agents such as, ethylene dimethacrylate or divinylbenzene, which provide enhanced dimensional stability. As noted above, the partially polymerized comonomer mixture used to prepare the high index copolymer segment is preferably prepared in two distinct steps: Mixture C is partially polymerized before Mixture D is added to it.

The total monomer content of mixtures C and D is made-up of:

a) from 30 to 90% of at least one polymerizable vinyl monomer having a refractive index of at least 1.540 having a substituted aromatic ring structure.
b) from 1 to 60% of an acrylate having the formula:

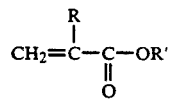

where R=H or a monovalent organic radical having not more than seven carbon atoms and R'=a monovalent organic radical having up to 20 carbon atoms.
c) from 0.1 to 15% of a polymerizable polyvinyl crosslinking agent.
d) from 0 to 2% of a polymerizable vinyl silane coupling agent.
e) from 0.1 to 3.0% of a vinyl polymerization initiator.

Mixture C as indicated above contains about 10 to 90% (w/w) of the total comonomers used in the preparation of the high refractive index portion. Mixture D contains the balance of the required comonomers. Mixture C preferably contains a major proportion of the comonomers employed, and it is preferred to form a mixture in which 50 to about 90% of the total comonomers employed are in Mixture C.

The use of crosslinking agents in both the low and high refractive index comonomer polymerization mixture is necessary so as to prepare copolymers having satisfactory dimensional stability and a suitable hardness, qualities which promote good visual acuity and improved resistance to scratching on the lens surface. The total amount of crosslinking agent used in the practice of this invention will normally vary from about 0.05% up to about 35% (w/w) and preferably from about 0.10% to about 25% (w/w) of the total comonomers used in the preparation of the bifocal contact lens blank. The precise amount will depend upon the specific crosslinking agents used and the properties desired in the bifocal contact lens.

In the preparation of partially polymerized Mixture A of the comonomer mixture, it is preferable to use diacryl crosslinking agents in which the terminal vinyl groups are separated by at least ten atoms. Suitable crosslinking agents of this type included tetraethylene dimethacrylate and 1,3-bis(methacryloxypropyl1,1,3,3-tetrakis-(trimethylsiloxy)disiloxane. Use of such crosslinking agents permits greater latitude in processing conditions. It is preferable not to use shorter crosslinking such as, ethylene dimethacrylate, in Mixture A and if they are used, they should only form a very small fraction of the comonomer mixture.

In comonomer Mixture B, shorter chain crosslinking agents having nine or fewer atoms between the vinyl groups are effective in concentrations from about 0.05% to about 10% and preferably from about 0.1% to about 8% of the total comonomers used in the preparation of the low index portion. Suitable short chain crosslinking agents include 1,2 ethylene dimethacrylate; 1,4-butylene dimethacrylate and diethylene dimethacrylate. Both short and long chain crosslinking agents can be used in comonomer Mixture B. Mixture A always forms the partially polymerized component in the Mixture A/B and where short chain crosslinking agents are used always contain less of such crosslinking agents.

The use of a crosslinking agent in Mixture C is optional, because Mixture D will always contain crosslinking agent. It is necessary to avoid gelling of C, but crosslinking agents having at least 10 atoms between the vinyl groups are suitable for use in Mixture C if desired up to a concentration of about 20% of the total comonomers used in Mixture C. Shorter chain crosslinking agents such as, ethylene dimethacrylate and divinyl benzene or longer chain crosslinking agents or both types up to a concentration of 20% are used in Mixture D to provide the desired dimensional stability of the resulting copolymer.

In the embodiment of the invention where both or either of the high and low refractive index copolymers are prepared as interpenetrating networks, it is essential that the partial copolymerization of Mixture A and of Mixture C be closely monitored so that the relative viscosity at which A and C are mixed, respectively, with B and D is controlled between selected limits. While the optimum relative viscosity will vary with the particular comonomers used in Mixture A and in Mixture C and is easily determinable by experiment, it is normally kept between 1.10 and 25 and preferably between 1.50 and 12. The relative viscosity is defined as the viscosity of the partially polymerized Mixture A or Mixture C divided by the viscosity of the initial Mixture A or Mixture C, respectively, just before it is purged with nitrogen. If the relative viscosity of Mixture A or Mixture C falls below about 1.10, undesirable shrinkage will occur during the polymerization process. On the other hand, if the relative viscosity of Mixture A or Mixture C greatly exceeds about 25, the partially polymerized Mixture A, or Mixture C will be difficult to dispense properly and a dimensionally unstable bifocal contact lens blank may result. This particularly applies to Mixture C.

The measurement of relative viscosity of A and C enables the degree of partial polymerization to be achieved to be controlled in a consistent manner, so that there is reproducibility from one batch of material to another and the formation of the interpenetrating network takes place starting substantially from the same degree of polymerization of A and C, respectively. Care must also be taken that the addition of the other mixture, B to A, and D to C, does not result in a material with a viscosity which interferes with the ability to form a satisfactory interpenetrating network or interfacial bond. If by the addition of B and D, respectively, the relative viscosity is increased to above 25, the mixture will become more difficult to cast against the solid surface and the interfacial bond may be unsatisfactory while below 1.10, there may be no formation of an interpenetrating network.

Free radical polymerization initiators of the type commonly used in the polymerization of ethylenically unsaturated monomers are suitable for use in the present invention. They include such representative polymerization initiators as 2,2'-azobis (methylbutyronitrile)(-Vazo 67); 2,2'-azobis-(isobutyronitrile (AIBN); benzoyl peroxide and tertiary butyl peroxypivalate. Initiators, sold under the tradename "Vazo," are preferred since they give uniformly good results and do not produce oxygenated residues. From about 0.1% to about 3% and preferably from about 0.1 to about 1.5% (w/w) of initiator is used.

This invention makes possible the preparation of superior, high quality novel oxygen permeable bifocal contact lens by a new, economical cast molding process. The two-stage polymerization processes for the preparation of the near and for the far distance viewing segments permits the polymerization process to be controlled so as to yield copolymers which readily join together at the interface to form a strong bond which results in excellent optical properties.

As the monomers used in forming the mixtures can differ to a large extent from one another in refractive index, this factor must be taken account of in selecting the proportions used in a formulation e.g., if the proportion of high index material say with a refractive index of 1.540 or higher is being kept low, then e.g., a methacrylate monomer can be chosen to compensate for this e.g., one could use benzyl methacrylate with an index of 1.514 as opposed to methyl methacrylate with an index of 1.414.

DESCRIPTION OF THE PREFERRED EMBODIMENT

One method by which a bifocal contact lens according to the present invention can be produced is that described in U.S. Pat. No. 3,560,598. The method consists of casting a lens forming material against a curved optical surface in a mold cavity where the optical surface is provided with a protrusion in the shape of the high index segment desired in the finished lens or preform. This forms a depression in the cast lens or preform which is subsequently filled with high index lens forming material. The process involves removing the lens or preform from the mold before filling the depression as it is formed on the surface which is cast against the optical surface on the mold. In using this method, it is essential to use the monomer mixtures disclosed in this specification in order to obtain a user satisfying oxygen permeable two-piece bifocal contact lens.

A preferred method, according to the present invention, is one in which a recess in the lens or preform is formed by providing a protrusion on a cover for an open top mold. The open mold is filled with lens forming material which will form the distance portion of the lens or perform, the cover is put on and the protrusion forms a recess in the lens material. The assembly can then be held together by a spring and heated in an oven in a nitrogen atmosphere for the time necessary to polymerize the lens material. The recess then formed is filled with the material used to form the near portion of the lens.

Figure 1:
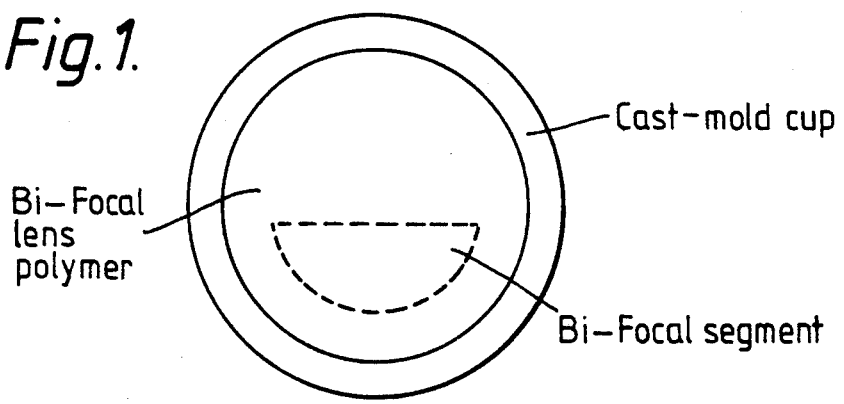
FIG. 1 is a front view of a bifocal contact lens preform or button made in accordance with the invention in which the position of the segment is shown by a dotted line.
Figure 2:
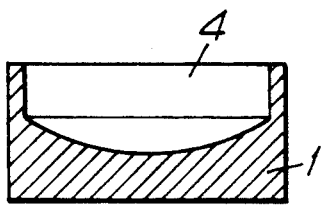
FIGS. 2-7 are sectional views of the different molding stages in a manufacturing process to manufacture the embodiment of the invention shown in FIG. 1
Figure 3:
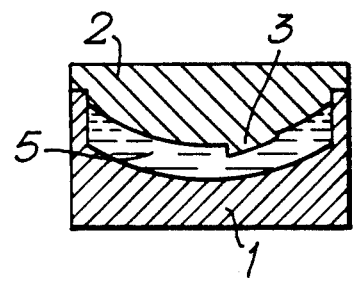
Figure 4:
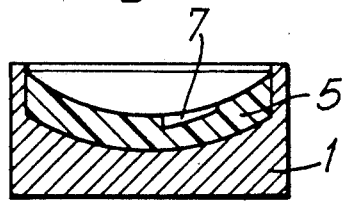
Figure 5:
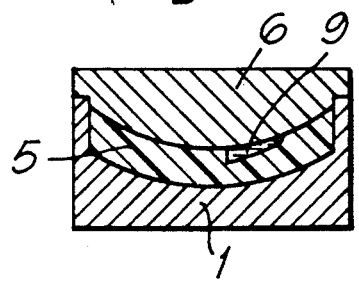
Figure 6:
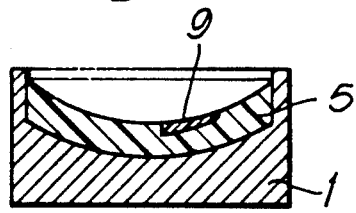
Figure 7:
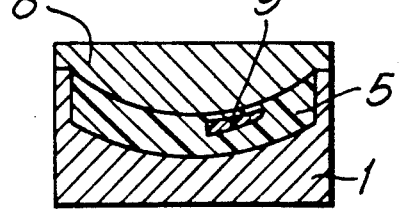

FIG. 2-7 illustrate this method of forming a bifocal contact lens preform or button according to the present invention. A mold cavity 4 in an open top mold 1 is partially filled with a material which will form a low index portion of a bifocal contact lens. A cover 2 with a protruding portion 3 is now placed on the open top mold and held in place with a spring clip. The mold assembly thus formed is heated in a nitrogen atmosphere to polymerize the material which forms the low index portion 5 of the lens. After polymerization, the assembly is opened and the cover removed. The depression 7 formed in the low index material 5 is now filled with material 9 of a higher refractive index than that used to form the low index portion of the lens. A cover 6 is placed on the open top mold and held in place with a spring clip. This assembly is then heated in a nitrogen atmosphere to polymerize the high index material. Once polymerization is complete the button or preform may be removed from the mold assembly and machined into the desired configuration for a finished lens. It can also be machined in the mold. In our preferred process, a further step is undertaken so as to encapsulate a high index portion of the lens preform in the low index material. Once the cover 6 is removed, low index lens forming material is placed in the open topped mold and a cover 8 placed on the mold and held in place by a spring clip. The assembly thus formed is then heated in a nitrogen atmosphere to polymerize the material added to the mold. Once polymerization is complete, the preform or button can be removed from the mold and machined to any desired configuration as a finished bifocal contact lens or left in the mold and machined in the mold.

The mold and cover surface, which contact the lens forming materials, may, if desired, be formed with a radius surface corresponding to the desired optical surface of the finished lens so that a fully finished or semi-finished lens may be cast in situ depending on whether all or only one of the lens material contacting surfaces are shaped so as to cast a finished lens surface.

The open topped mold may be made of a material which is more easily machined than the copolymers forming the lens preform or button such as a polyester. Preferred materials for forming the open topped mold are acrylate blends such as, acrylate styrene acrylonitrile ("ASA") and polycarbonate ("PC"); ASA and poly(methylmethacrylate) ("PMMA").

We prefer to make the mold from one of the acrylic blends disclosed above and the button need not be removed from the mold before machining. The mold acts as a carrier for the button or preform and supports the button during machining, so that it can be made thinner reducing the amount of diamond wear experienced in machining the actual button. The acrylic material causes substantially less wear. The mold covers may be made of a polyolefin such as, low or high density polypropylene.

The lens materials used are those described above so that unlike the prior art two-piece bifocal contact lenses formed with a high index segment, the lenses of the present invention are oxygen permeable with a Dk of at least $10 \times 10^{-11}$.

The following examples are presented to facilitate an understanding of the present invention and not to limit its scope.

EXAMPLE 1

Mixture A containing 10 parts of methyl methacrylate; 20 parts of 2,2,2-trifluoroethyl methacrylate; 37 parts of 3-methacryoxypropyltris-(trimethylsiloxy)silane; 5.6 parts of bis-(trimethylsiloxy)-3-methacryloxypropylsilanol; 4.4 parts of 1,3-bis (methacryloxypropyl)-1,1,3,3 tetrakis (trimethylsiloxy)silane; 8 parts of methacrylic acid and 1 part of 2,2'-azobis(isobutyronitrile) was gradually warmed to a temperature of 40° C. and then purged with a stream of dry nitrogen. The viscosity was measured at regular intervals relative to the viscosity of the initial Mixture A before purging with nitrogen. The polymerization was permitted to proceed until the relative viscosity reached 3.30. At that time inhibited Mixture B which contained 3 parts of methyl methacrylate, 4 parts of 2,2,2,-trifluoroethyl methacrylate, 2.4 parts of 3-methacryloxypropyl-tris-(trimethylsiloxy)silane; 0.3 parts of 3-methacryloxypropyl-bis-(trimethylsiloxy) silanol; 5 parts of ethylene dimethacrylate and 0.3 part of 1;3bis(methacryloxypropyl)-1,1,3,3-tetrakis-(trimethylsiloxy)silane, was added to the partially polymerized Mixture A in the presence of air to stop the polymerization process. The resulting partially polymerized combined mixture of A and B was cooled to room temperature and dispensed into an open top mold made of acrylic blend. The casting was then covered with a propylene mold cover that has a crescent-shape protrusion and a predetermined radius surface, and the two mold parts held together by a spring clip. The assembly was heated at 40° to 45° C. for 10 hours in a nitrogen atmosphere in an oven. The temperature was then raised to 60° C. for one hour. The assembly was removed from the oven and cooled to room temperature. The mold cover was then removed leaving a low refractive index copolymer contact lens button with a recess into which a higher index material can be cast.

Mixture C containing 30 parts of 3-(N-carbazoyl)-propyl acrylate; 50 parts of 4-vinylanisole; 4 parts of methyl methacrylate; 4 parts of N-vinylpyrrolidone, and 0.1 part of benzoyl peroxide was gradually raised to a temperature of 60° C. and then purged with nitrogen. The polymerization was continued at 60° C. until a relative viscosity of 4.1 was reached in about 2.5 hours. At this juncture, Mixture D, which contained 3 parts of 4-vinylanisol; 2 parts of methyl methacrylate; 5 parts of ethylene glycol dimethacrylate; 0.5 part of 2,2'-azobis-(isobutyronitrile); 1 part of vinyltrimethoxysilane and 1 part of a 2% solution 2,2'(2,5-thiophenediyl)bis 5-tertiary-butyl benzoxazole (an optical brightener), was added to Mixture C. The combined Mixture C and Mixture D was cooled to room temperature and kept at 5° C. until used for cast molding of the near vision segment.

A portion of the partially polymerized Mixture C and Mixture D, prepared as described in above, was cast into the recess in the button prepared from Mixtures A and B which is still in the open top mold. The filled mold was covered with a polypropylene mold cover. The assembly, held together by a spring clip, was heated in an oven at 40° C. for 10 hours in a nitrogen atmosphere. The temperature was then raised to a temperature of 60° C. over a period of 90 minutes and kept at that temperature for one hour. The assembly was removed from the oven and the mold cover was removed and discarded. An additional casting was then made by adding more of the partially polymerized combined Mixture A and Mixture B to the open top mold to encapsulate the near segment. The filled mold was covered with a mold cover and the assembly held together by a spring clip was placed in an oven and heated at 41° C. for 8 hours in a nitrogen atmosphere and then heated at 69° C. for 5.5 hours and finally at 83° C. for 5 hours. The assembly was removed from the oven and allowed to cool to 35° C. over a period of 2.5 hours. After removal of the mold cover the filled mold was cut to desired parameters for a finished lens. The copolymer of the near vision segment has a refractive index lens of 1.600, and the distance vision portion a refractive index of 1.475. The finished lens had a Dk of $30 \times 10^{-11}$.

EXAMPLE 2

Mixture A containing 22 parts of methyl methacrylate; 12 parts of 2,2,2-trifluoroethyl methacrylate; 35 parts of 3-methacryoxypropyltris-(trimethylsiloxy)silane; 4 parts of bis-(trimethylsiloxy)-3-methacryloxypropylsilanol; 4 parts of 1,3-bis(methacryloxpropyl)-1,1,3,3 tetrakis (trimethylsiloxy)silane; 9 parts of methacrylic acid and 1 part of 2,2,'-azobis(isobutyronitrile) was gradually warmed to a temperature of 40° C. and then purged with a stream of dry nitrogen. The viscosity was measured at regular intervals relative to the viscosity of the initial Mixture A before purging with nitrogen. The polymerization was permitted to proceed until the relative viscosity reached 1.94. At the time, inhibited Mixture B, which contained 3 parts of methyl methacrylate; 2 parts of 2,2,2-trifluoroethyl methacrylate; 2 parts of 3-methacryloxypropyl-tris-(trimethylsiloxy)silane; 1 part of 3 -methacryloxypropyl-bis-(trimethylsiloxy) silanol; 5 parts of ethylene dimethacrylate and 1 part of 1,3bis(methacryloxypropyl)-1,1,3,3-tetrakis-(trimethylsiloxy)silane, was added to the partially polymerized Mixture A in the presence of air to stop to polymerization process. The resulting partially polymerized combined mixture of A and B was cooled to room temperature and dispensed into an open topped mold made of an acrylic blend. The casting was then covered with a polypropylene mold cover that has a crescent-shape protrusion and a predetermined radius surface, and the two mold parts held together by spring clip. The assembly was heated at 40° and 45° C. for 10 hours in a nitrogen atmosphere in an oven. The temperature was then raised to 60° C. for one hour. The assembly was removed from the oven and cooled to room temperature. The mold cover was then removed to leave a low refractive index copolymer contact lens button with a recess to receive high index material. The button has a refractive index of 1.4750 and a Dk of 35, and was left in the open topped mold.

A mixture with a refractive index of 1.5490 that contained 30 parts of 3-(N-carbazoyl)-propyl acrylate; 53 parts of 4-vinylanisole; 6 parts of methyl methacrylate; 4 parts of N-vinylpyrrolidone; 5 parts of ethylene glycol dimethacrylate; 1 part of vinyl trimethylsilane; 1 part 2,2'(2,5-thiophene diyl) bis(5-tertiarybutyl benzoxazole) solution; 0.1 part benzoyl peroxide and 0.5 parts 2,2', azo bis(isobutyronitrile) was cast into the recess. The open topped mold was covered with a radius polypropylene mold cover. The assembly, held together by a spring clip, was heated in an oven at 40° C. for 10 hours in a nitrogen atmosphere. The temperature was then raised to a temperature of 60° C. over a period of 90 minutes and kept at that temperature for one hour. The assembly was removed from the oven and the cover was removed and discarded. An additional casting was then made by adding more partially polymerized combined mixture A and Mixture B to the open top mold in order to encapsulate the near segment. The filled mold was covered with a polypropylene cover and the assembly held together by a spring clip was placed in an oven and heated at 41° C. for 8 hours in a nitrogen atmosphere and then heated at 69° C. for 5.5 hours and finally at 83° C. for 5 hours. The assembly was removed from the oven and allowed to cool to 35° C. over a period of 2.5 hours. After removal of the cover, the resulting bifocal lens blank was cut to desired parameters without removal from the mold. The copolymer of the near vision segment had a refractive index of 1.600 and the resulting bifocal contact lens had a Dk of $10 \times 10^{-11}$.

EXAMPLE 3-7

Example 3-7 were carried out in the same manner as Example 1 using the formulations of A/B and C/D set out in Table I.

TABLE I

| Example | 3 | | | | 4 | | | | 5 | | | |
|---|---|---|---|---|---|---|---|---|---|---|---|---|
| Mixture | A | B | C | D | A | B | C | D | A | B | C | D |
| Monomer | | | | | | | | | | | | |
| MMA | 18 | 5 | 5 | 2 | 22 | 3 | 6 | 3 | 11 | 1 | 4 | 5 |
| 3FMA | — | — | — | — | 12 | 2 | — | — | 21 | 3 | — | — |
| CPA | — | — | 30 | — | — | — | 30 | — | — | — | 24 | — |
| VC | — | — | — | — | — | — | — | — | — | — | — | — |
| CMEA | — | — | — | — | — | — | — | — | — | — | 6 | — |
| VA | — | — | — | — | — | — | — | — | — | — | — | — |
| BMA | — | — | — | — | — | — | 48 | 3 | — | — | — | — |
| TBS | — | — | — | — | — | — | — | — | — | — | 40 | 10 |
| ST | — | — | 47 | 5 | — | — | — | — | — | — | — | — |
| MAPS | 42 | 3 | — | — | 35 | 2 | — | — | 35 | 4 | — | — |
| SiOH | 7 | 1 | — | — | 4 | 1 | — | — | 5 | 1 | — | — |
| BMPS | 5 | 2 | — | — | 4 | 1 | — | — | 4 | 1 | — | — |
| EDM | — | 7 | — | 5 | — | 5 | — | 5 | — | 5 | — | — |
| EBPD | — | — | — | — | — | — | — | — | — | — | 1 | 4 |
| MAA | 9 | — | — | — | 8 | — | — | — | 8 | — | — | — |
| NVP | 1 | — | — | 4 | 1 | — | — | 4 | 1 | — | 2 | 2 |
| VMS | — | — | — | 1 | — | — | — | 1 | — | — | — | 1 |
| OB | — | — | — | 1 | — | — | — | 1 | — | — | — | 1 |
| AIBN | 1.0 | — | — | 0.5 | 0.8 | — | — | 0.5 | 1 | — | — | .5 |
| BP | — | — | 0.1 | — | — | — | 0.1 | — | — | — | .1 | — |
| RV(i) | 2.41 | — | | — | 1.94 | — | | — | 3.33 | — | | — |
| RI | | 1.4173 | | 1.5616 | | 1.4192 | | 1.5400 | | 1.4156 | | 1.5476 |
| Dk | | 25 | | | | 12 | | | | 30.0 | | |
| RV(ii) | | | 8.82 | | | | 2.86 | | | | 1.71 | |

| Example | 6 | | | | 7 | | | |
|---|---|---|---|---|---|---|---|---|
| Mixture | A | B | C | D | A | B | C | D |
| Monomer | | | | | | | | |
| MMA | 24 | 3 | 4 | 2 | 4 | 8 | 4 | 2 |
| 3FMA | 10 | 2 | — | — | 2 | 22 | — | — |
| CPA | — | — | — | — | — | — | 24 | — |
| VC | — | — | 30 | — | — | — | — | — |
| CMEA | — | — | — | — | — | — | 6 | — |
| VA | — | — | 43 | 10 | — | — | 43 | 10 |
| BMA | — | — | — | — | — | — | — | — |
| TBS | — | — | — | — | — | — | — | — |
| ST | — | — | — | — | — | — | — | — |
| MAPS | 35 | 2 | — | — | 2.34 | 36.66 | — | — |
| SiOH | 4 | 1 | — | — | 0.36 | 5.64 | — | — |
| BMPS | 4 | 1 | — | — | 0.30 | 4.70 | — | — |
| EDM | — | 5 | — | 5 | — | 5.0 | — | 5.0 |
| EBPD | — | — | — | — | — | — | — | — |
| MAA | 8 | — | — | — | 1.0 | 7.0 | — | — |
| NVP | 1 | — | 2 | 2 | — | 1 | 2 | 2 |
| VMS | — | — | — | 1 | — | — | — | 1 |
| OB | — | — | — | 1 | — | — | — | 1 |
| AIBN | 0.8 | — | — | .5 | 0.2 | 0.8 | 0.1 | — |
| BP | — | — | .1 | — | — | — | — | — |
| RV(i) | 1.94 | — | | — | 4.13 | — | | — |
| RI | | 1.4192 | | 1.5978 | | 1.4750 | | 1.5681 |
| Dk | | 11.0 | | | | 35.0 | | |
| RV(ii) | | | 6.29 | | | | | 2.95 |

Legend for TABLE I

MMA   Methyl methacrylate
3FMA  2,2,2,-trifluoroethyl methacrylate
CPA   3-N-carbazoylpropyl acrylate
VC    N-vinylcarbazole
CMEA  2-N-carbazoyl-1-methylethyl acrylate
VA    vinylanisole
BMA   benzyl methacrylate
TBS   tertiary-butyl styrene
MAPS  3-methacryloxypropyl-tris(trimethylsiloxy) silane
SiOH  bis(trimethylsiloxy)-gamma-methacryloxypropylsilanol
BMPS  1,3-bis(methacryloxypropyl)-1,1,3,3,tetrakis-(trimethylsiloxy)disiloxane
EDM   ethylene glycol dimethacrylate
EBPD  ethoxylated bis phenol A dimethacrylate
MAA   methacrylic acid
NVP   N-vinyl pyrrolidone
VMS   vinyltrimethoxysilane
OB    2,2'(2,5-thiophenediyl)bis(5-tertiary butylbenzoxazole)

TABLE I-continued

Dk  $(y)10^{-11}$ $(cm^2/sec)(mlO_2 \times mm\ Hg)$ at 35-37° C.
RV(i)  relative viscosity of Mixture A
RV(ii)  relative viscosity of Mixtures C and D
RI  refractive index of mixture before polymerization

EXAMPLE 8

A distance vision gas permeable monomer mixture with a refractive index of 1.4175 that contained 27 parts of methyl methacrylate; 12 parts of 2,2,2-trifluoroethyl methacrylate; 37 parts of 3-methacryloxypropyl-tris (trimethsiloxy) silane; 5 part of bis(trimethyl siloxy)-3-methacryloxypropylsilanol; 5 parts of 1,3-bis (methacryloxypropyl)-1,1,3,3,tetrakis (trimethylsiloxy) silane; 8 parts of methacrylic acid; 6 parts of ethylene diemthacrylate; and 0.7 parts of 2,2'-azobis (isobutyronitrile) was cast into polymerization tubes and cured at 40° C. for 30 hours and post-cured at 70° for 20 hours. The copolymer rods thus formed were removed from the tubes and cut into optical blanks. A near vision segment cavity was machined in one of the blanks and a near vision monomer mixture with a refractive index of 1.5490 that contained 30 parts of 3-(N-carbazoyl)-propyl acrylate; 53 parts of 4-vinylanisole; 6 parts of methyl methacrylate; 4 parts of N-vinylpyrrolidone; 5 parts of ethylene dimethacrylate; 1 part of vinyl trimethoxysilane; 1 part 2,2'(2,5-thiophene diyl) bis(5-tertiary-butyl benzoxazole) solution; 0.1 part benzoyl peroxide and 0.5 parts 2,2',azo bis(isobutyronitrile) was cast into the cavity recess. The blank and filled recess were covered with a radius polypropylene mold cover. The assembly, held together by a spring clip, was placed in an oven and heated at 41° C. for 8 hours in a nitrogen atmosphere and then heated at 69° C. for 5.5 hours and finally at 83° C. for 5 hours. The assembly was removed from the oven and allowed to cool to 35° C. over a period of 2.5 hours. After removal of the cover, the resulting bifocal lens blank was cut to desired parameters. The bifocal lens had a Dk of $12 \times 10^{-11}$.

Accordingly, what is claimed is:

1. An oxygen permeable bifocal contact lens having a distance vision portion with one refractive index and a near vision portion with another higher refractive index and a Dk of at least 10, the distance portion forming the major portion of the lens and being formed as a crosslinked copolymer with a refractive index of not more than 1.49 from monomeric materials which include one or more monomers capable of imparting oxygen permeability to the finished lens, and the near vision portion similarly being formed as a crosslinked copolymer from a monomer mixture which includes one or more monomers at a concentration and with a refractive index such that the near vision portion has a refractive index of at least 1.540 including at least one vinyl monomer having substituted aromatic ring structure.

2. An oxygen permeable bifocal contact lens as claimed in claim 1, in which the distance vision portion is formed as an interpenetrating network.

3. An oxygen permeable bifocal contact lens as claimed in claim 2, in which the near vision portion is also formed as in interpenetrating network.

4. An oxygen permeable bifocal contact lens as claimed in claim 2, in which the interpenetrating network is formed by polymerizing a mixture of two monomer mixtures, one of which is partially polymerized to a selected relative viscosity before being mixed with the other.

5. An oxygen permeable bifocal contact lens as claimed in claim 4 in which the distance vision portion is formed as an interpenetrating network from two monomer mixtures A and B and the composition is selected so that Mixture A contains 10% to 90% (w/w) of the total monomer formula weight, the balance being Mixture B.

6. An oxygen permeable bifocal contact lens as claimed in claim 5 where Mixture A contains 50% to 95% of the total monomer formula weight, and the balance is Mixture B.

7. An oxygen permeable bifocal contact lens as claimed in claim 4 in which the near vision portion is formed as an interpenetrating network with a refractive index of at least 1.540 from two monomer mixtures C and D and the resultant composition is selected so that Mixture C contains 10 to 90% of the total monomer formula weight, and the balance is Mixture D.

8. An oxygen permeable bifocal contact lens as claimed in claim 5 in which the total monomer content of mixtures A and B is selected from:

a) 0 to 30% of an alkyl acrylate having the formula:

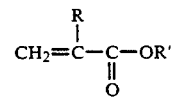

where R = H or a monovalent organic radical having not more than 7 carbon atoms and R' = a monovalent organic radical having up to 20 carbon atoms, b) 0 to 35% of a fluoroacrylate monomer having the formula:

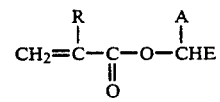

where R = H or a monovalent organic radical having not more than 7 carbon atoms; A = H or E and E is a fluorinated monovalent radical having no more than 20 carbon atoms, c) 10 to 70% of a silicone acrylate of the general formula:

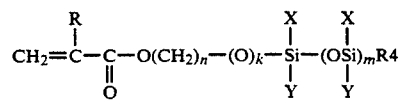

where R = H or monovalent organic radical having from 1 to 7 carbon atoms or Z; Y is a monovalent organic radical having from 1 to 7 carbon atoms or Z; and

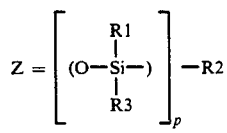

where R1, R2, and R3 are the same or different monovalent organic radicals having from 1 to 7 carbon atoms and R4 is OH or a monovalent organic radical having from 1 to 7 carbon atoms; and $k=0-1$; $m=1-3$; $n=1-5$; and $p=1-3$, d) from 0.1 to 20% of at least one crosslinking agent,
e) from 1 to 10% of a polymerizable vinyl hydrophilic wetting agent.

9. An oxygen permeable bifocal contact lens as claimed in claim 7 in which the total monomer content of Mixtures C and D is selected from:
a) from 30 to 90% of at least one polymerizable vinyl monomer having a refractive index of at least 1.540 and having a substituted aromatic ring structure,
b) from 1 to 60 of an acrylate having the formula:

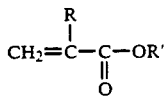

where R=H or a monovalent organic radical having not more than 7 carbon atoms and R' is a monovalent organic radical having up to 20 carbon atoms,
c) from 0.1 to 15% of a polymerizable polyvinyl crosslinking agent,
d) from 0 to 2% of a polymerizable vinyl silane coupling agent,
e) from 0.1 to 3.0% of a vinyl polymerization initiator.

10. An oxygen permeable bifocal contact lens as claimed in claim 9 in which the polymerizable vinyl monomer having a refractive index of at least 1.540 comprises one or more carbazoles.

11. An oxygen permeable bifocal contact lens as claimed in claim 10 in which one or more carbazoles are selected from the group consisting of N-vinyl carbazole, 3-(N-carbazoyl) propyl acrylate.

12. An oxygen permeable bifocal contact lens as claimed in claim 9 in which at least one polymerizable vinyl monomer having a refractive index of at least 1.540 is selected from the group consisting of 2-(N-phenothiazinyl) ethyl acrylate, p-t-butylstyrene, vinyl naphthalene, and phenyl and benzyl methacrylates.

13. An oxygen permeable bifocal contact lens as claimed in claim 1 in which the distance vision portion of the lens surrounds the near vision portion.

14. An oxygen permeable bifocal contact lens as claimed in claim 3, in which the interpenetrating network is formed by polymerizing a mixture of two monomer mixtures, one of which is partially polymerized to a selected relative viscosity before being mixed with the other.

15. An oxygen permeable bifocal contact lens as claimed in claim 14 in which the distance vision portion is formed as an interpenetrating network from two monomer mixtures A and B and the composition is selected so that Mixture A contains 10% to 90% (w/w) of the total monomer formula weight, the balance being Mixture B.

16. An oxygen permeable bifocal contact lens as claimed in claim 15 where Mixture A contains 50% to 95% of the total monomer formular weight, and the balance is Mixture B.

17. An oxygen permeable bifocal contact lens as claimed in claim 15 in which the total monomer content of mixtures A and B is selected from:
a) 0 to 30% of an alkyl acrylate having the formula:

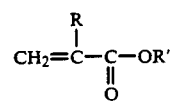

where R=H or a monovalent organic radical having not more than 7 carbon atoms and R'=a monovalent organic radical having up to 20 carbon atoms,
b) 0 to 35% of a fluoroacrylate monomer having the formula:

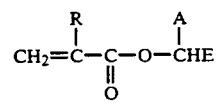

where R=H or a monovalent organic radical having not more than 7 carbon atoms; A=H or E and E is a fluorinated monovalent radical having no more than 20 carbon atoms,
c) 10 to 70% of a silicone acrylate of the general formula:

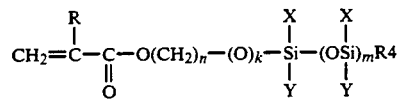

where R=H or monovalent organic radical having from 1 to 7 carbon atoms or Z; Y is a monovalent organic radical having from 1 to 7 carbon atoms or Z; and

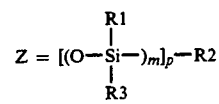

where R1, R2, and R3 are the same or differnt monovalent organic radicals having from 1 to 7 carbon atoms and R4 is OH or a monovalent organic radical having from 1 to 7 carbon atoms; and $k=0-1$; $m=1-3$; $n=1-5$; and $p=1-3$, d) from 0.1 to 20% of at least one crosslinking agent,
e) from 1 to 10% of a polymerizable vinyl hydrophilic wetting agent.

18. An oxygen permeable bifocal contact lens as claimed in claim 6 in which the total monomer content of mixtures A and B is selected from:
a) 0 to 30% of an alkyl acrylate having the formula:

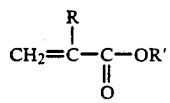

where R=H or a monovalent organic radical having not more than 7 carbon atoms and R'=a monovalent organic radical having up to 20 carbon atoms, b) 0 to 35% of a fluoroacrylate monomer having the formula:

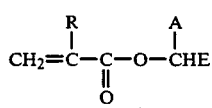

where R=H or a monovalent organic radical having not more than 7 carbon atoms; A=H or E and E is a fluorinated monovalent radical having no more than 20 carbon atoms, c) 10 to 70% of a silicone acrylate of the general formula:

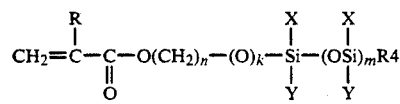

where R=H or monovalent organic radical having from 1 to 7 carbon atoms or Z; Y is a monovalent organic radical having from 1 to 7 carbon atoms or Z; and

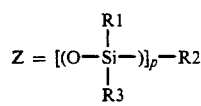

where R1, R2, and R3 are the same or different monovalent organic radicals having from 1 to 7 carbon atoms and R4 is OH or a monovalent organic radical having from 1 to 7 carbon atoms; and k=0-1; m=1-3; n=1-5; and p=1-3, d) from 0.1 to 20% of at least one crosslinking agent, e) from 1 to 10% of a polymerizable vinyl hydrophilic wetting agent.

19. An oxygen permeable bifocal contact lens as claimed in claim 16 in which the total monomer content of mixtures A and B is selected from:

a) 0 to 30% of an alkyl acrylate having the formula:

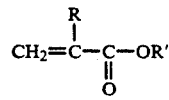

where R=H or a monovalent organic radical having not more than 7 carbon atoms and R'=a monovalent organic radical having up to 20 carbon atoms, b) 0 to 35% of a fluoroacrylate monomer having the formula:

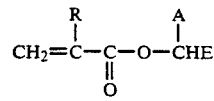

where R=H or a monovalent organic radical having not more than 7 carbon atoms; A=H or E and E is a fluorinated monovalent radical having no more than 20 carbon atoms, c) 10 to 70% of a silicone acrylate of the general formula:

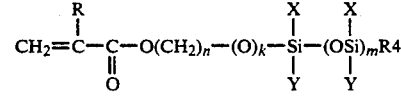

where R=H or monovalent organic radical having from 1 to 7 carbon atoms or Z; Y is a monovalent organic radical having from 1 to 7 carbon atoms or Z; and

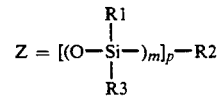

where R1, R2, and R3 are the same or different monovalent organic radicals having from 1 to 7 carbon atoms and R4 is OH or a monovalent organic radical having from 1 to 7 carbon atoms; and k=0-1; m=1-3; n=1-5; and p=1-3, d) from 0.1 to 20% of at least one crosslinking agent, e) from 1 to 10% of a polymerizable vinyl hydrophilic wetting agent.

20. An oxygen permeable bifocal contact lens as claimed in any one of claims 4, 5, 6 or 8 in which the total monomer content of Mixtures C and D is selected from:

a) from 30 to 90% of at least one polymerizable vinyl monomer having a refractive index of at least 1.540 and having a substituted aromatic ring structure, b) from 1 to 60 of an acrylate having the formula:

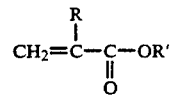

where R=H or a monovalent organic radical having not more than 7 carbon atoms and R' is a monovalent organic radical having up to 20 carbon atoms, c) from 0.1 to 15% of a polymerizable polyvinyl crosslinking agent, d) from 0 to 2% of a polymerizable vinyl silane coupling agent, e) from 0.1 to 3.0% of a vinyl polymerization initiator.

21. An oxygen permeable bifocal contact lens as claimed in claim 20 in which the polymerizable vinyl monomer having a refractive index of at least 1.540 comprises one of more carbazoles.

22. An oxygen permeable bifocal contact lens as claimed in claim 21 in which one or more carbazoles are selected from the group consisting of N-vinyl carbazole, 3(N-carbazoyl) propyl acrylate.

23. An oxygen permeable bifocal contact lens as claimed in claim 20 in which at least one polymerizable vinyl monomer having a refractive index of at least 1.540 is selected from the group consisting of 2-(N-phenothiazinyl) ethyl acrylate, p-t-butylstyrene, vinyl naphthalene, and phenyl and benzyl methacrylates.

24. A method of producing an oxygen permeable bifocal contact lens having a near vision portion and a distance vision portion in which the near vision portion is formed in the body of the lens by polymerizing a partially polymerized mixture of interpenetrating network forming comonomers in contact with a surface shaped to leave a recess in the material after both polymerization and removal from contact with the shaped surface, the recess being of the same shape as the desired shape of the near vision portion of the finished lens, and a partially polymerized mixture of interpenetrating network comonomers, including at least one vinyl monomer with refractive index of at least 1.540 and a substituted aromatic ring structure is placed in the recess and polymerized.

25. A method of producing a bifocal contact lens as claimed in claim 24 in which the near vision portion is covered with the material used to form the distance vision portion of the lens by polymerizing a further quantity of said distance vision material in contact with the already formed near and distance vision portions.

26. A method as claimed in claim 25 is which a base curve is cut in the near vision portion before it is covered.

27. A method as claimed in claim 24, 25, or 26 in which a quantity of the material used to form the distance vision portion is placed in an open topped mold and a recess formed by providing the mold with a cover whose surface contacting the material is the recess forming surface.

28. The method as claimed in claim 27 in which a lens blank is formed within the open topped mold and the mold is used as a carrier during machining the lens blank to a final lens form.

29. An oxygen permeable bifocal contact lens with a Dk of at least $10 \times 10^{-11}$ in which the higher index segment is surrounded by an oxygen permeable low index material by forming the lens in a series of steps comprising first forming a preform from low index material in which there is provided a recess, filling the recess with a partially polymerized high index material formed from a monomer mixture which includes at least one vinyl monomer with a refractive index of at least 1.540 and having a substituted aromatic ring structure completing the polymerization of the high index material, and thereafter covering both the low index material and the high index material with further low index material in a partially polymerized form, and finally completing polymerization of the low index material to form a lens blank which is then machined into a bifocal contact lens.

30. A method of producing an oxygen permeable bifocal contact lens with a Dk of at least $10 \times 10^{-11}$ by embedding a high refractive index polymer segment within a lens blank which has a substantially lower refractive index than that of the internal segment, the lens blank having been prepared by casting a partially polymerized mixture of low refractive index interpenetrating network forming comonomers including a silicone acrylate monomer against a mold with a protrusion so as to form a recess in the blank and polymerizing to a solid state, the recess being then filled with a relatively high refractive index monomer mixture, which includes at least one vinyl monomer with a refractive index of at least 1.540 and a substituted aromatic ring structure, the polymerization of which is then completed in the recess, a sufficient quantity of partially polymerized low refractive index monomer mixture being next added to completely cover the high refractive index segment, and the resulting composition is cured to form the final bifocal contact lens blank, which is in turn machined to form a bifocal contact lens.

* * * * *